Patented Jan. 15, 1935

1,988,156

UNITED STATES PATENT OFFICE 1,988,156

PROCESS FOR THE PREPARATION OF PHENOLS

Maurice Ernest Bouvier, Lyon, and Louis Dominique Bardin, Venissieux, France, assignors to Societe des Usines Chimiques Rhone-Poulenc, Paris, France No Drawing. Application August 10, 1933, Serial No. 684,558. In Great Britain August 22, 1932

14 Claims. (Cl. 260—154)

This invention relates to the preparation of those phenols which are capable of being carried off by steam, and it constitutes a very important improvement over the general process for the preparation of phenols from alkali salts of arylsulphonic acids.

One object of the present invention is to provide a means whereby approximately one half of the caustic alkali generally used may be economized. Another object of the present invention is to provide a process which has the advantage of yielding the phenols directly instead of in the form of alkali phenates, as obtained by the usual processes.

The present invention is based upon the discovery that phenates in melted, pasty or powdered form are quantitatively hydrolyzed in the anhydrous state, when heated and treated with steam, at normal pressure as well as under reduced pressure and even under a certain excess of pressure above normal, on the condition of removing the phenol formed as it is liberated, by a stream of steam in sufficient quantity. In this manner the reaction:

(1) $Ar-O-M + H_2O \rightarrow Ar-O-H + M-O-H$ is performed almost quantitatively, and it is even possible to realize the unexpected reaction:

(2) $ArSO_3M + MOH \rightarrow ArOH + SO_3M_2$ (3) $ArSO_3M + 2MOH \rightarrow ArOH + SO_3M_2 + MOH$ Instead of the classical reaction:

(4) $Ar-SO_3-M + 2MOH \rightarrow Ar-O-M + SO_3M_2 + H_2O$ as given for example, by Ullmann (Enzyklopädie der technischen Chemie, 2nd edition, vol. 8, page 336).

It is already known that aqueous solutions of sodium phenate lose phenol by the distillation of a portion of their water (see Naumann, Müller and Lantelme, Jour. für Prakt. Chem. 1907, vol. 75, page 65) but these authors have ascertained that the quantity of phenol carried away by the steam diminishes rapidly when the concentration, in phenates, of the solution increases. The conclusion that dry steam would have no action on alkali phenates in the anhydrous state would therefore have been justified. Other authors, Rhodes, Jayne and Vivine (Ind. and Eng. Chem. vol. 19, page 804), investigating the conditions most favorable for the classical reaction (4) above, have tried to introduce more than one arylsulphonate molecule for two alkali molecules and, in order to be protected from the oxygen of the air, as well as to carry away the phenyl oxide formed during the reaction, they have operated by passing a stream of steam through their closed apparatus, which was heated by a gas flame to approximately 300 to 350° C. They have ascertained that the steam issuing from the apparatus had carried away about 15 per cent of the theoretical phenol under the form of free phenol, and 15 per cent under the form of phenyl oxide. These authors arrive at the conclusion that a contact of long duration between the sodium phenate and the sodium benzene sulphonate has an unfavorable effect and is responsible for the formation of diphenyl-oxide.

Our subsequent researches, however, have proved to them that certain conditions could be obtained under which the reactions (1), (2) and (3) above take place with quantitative yields, or with a formation of by-products in very small quantities (4 to 5 per cent of the total, at most) and it is this fact which constitutes the object of the present invention. According to this invention we prepare phenols by the complete hydrolysis of a phenate in the anhydrous state, particularly an alkali phenate, and more particularly sodium phenate, the phenate being melted and liquid, or more or less pasty, or in the state of a powder, by passing dry steam through the phenate, great care being taken to regulate the external heating so that the temperature remains in all parts of the charge within certain limits between which a quantitative yield of phenol is obtained, namely, between 280 and 370° C.

To attain this result it is sufficient to use any heating method that enables a strict control of the temperature to be obtained, such as, for example, the heating by means of a liquid bath or by means of a saturated steam or yet by means of a gas heated to a well determined temperature. This first condition is absolutely essential and it is certainly because of the direct gas flame heating which they used that Rhodes and his colleagues have obtained such poor yields in conditions which were apparently very near those which we have used. The temperatures to maintain during the reactions (1), (2) and (3) above are comprised between 280 and 370° C.

As a second essential condition for carrying out the process according to this invention, and contrary to the operative technique followed by Rhodes, the stream of steam must be caused to pass through the reacting mass and in sufficient quantity to carry away the phenol as it forms. It has been also observed that the carrying away of the phenol by the steam required a consumption of steam which becomes greater and greater as the quantity of free alkali formed in the reacting mass is more considerable.

In the case where the reaction takes place according to the equation:

$$ArSO_3M + MOH \rightarrow ArOH + M_2SO_3$$

it would appear that the reaction is the result of the two intermediate reactions:

$$ArSO_3M + 2MOH \rightarrow ArOM + M_2SO_3 + H_2O$$
$$ArOM + H_2O \rightarrow ArOH + MOH$$

as the quantity of alkali formed remains at a minimum and the carrying away of the phenol takes place smoothly giving an excellent final yield.

This method of working makes it possible to prepare phenol in a very economical manner, as it has the advantage over previously known processes of using only one molecular proportion of caustic alkali to one molecular proportion of phenol prepared.

In practice, the reacting mass is almost invariably the mass resulting from the preparation of the phenate itself, so that other materials are present, such as sulphonates, when such are the crude materials from which phenol is prepared, and sulphites which are by-products, or sodium chloride when phenate is prepared by reaction of chlorbenzene and sodium hydroxide.

One can, for example, first perform a normal fusion for the preparation of phenate (fusion of an aryl-sulphonate and of an alkali in proportions of approximately 1 molecule of the first for 2 molecules of the second) then add gradually aryl-sulphonate until the proportion has increased by 1 molecule, while the phenol is carried away by means of steam.

In this way one realizes the reaction:

$$ArOM + ArSO_3M + H_2O \rightarrow 2ArOH + SO_3M_2$$

The yields of phenols in the operative conditions above described are excellent and often exceed 90% with a formation of diphenyl oxide of only 2 to 5%.

The process according to this invention may be applied to the preparation of phenols under very varied conditions, and particularly to their preparation from alkali aryl-sulphonates.

It is understood that the word phenols in this specification is used in its broad general sense and includes besides phenol itself other phenolic bodies, such as cresols, xylenols and naphthols. In fact the process is applicable to all phenols which are volatile in steam and which are capable of being produced by the process of fusion of the corresponding alkali sulphonate with alkali hydroxide.

The following examples, without being limitative, illustrate how the invention may be carried out in practice.

Example 1.—In an apparatus fitted with a stirrer capable of scraping the sides, and heated externally by a fused metal bath, is placed a quantity of 500 grams of sodium phenate which is heated to 370° C.

Steam is then passed into the sodium phenate thus fused, and the steam is condensed at the far end of the apparatus and separated into fractions of 250 cc. each. The first fraction contains 38 grams of phenol, the second 18.85 grams, the third 13.31 grams. The caustic soda formed by the reaction diminishes the hydrolysis so that the quantity of phenol carried over diminishes in proportion as the amount of caustic soda increases, and the 24th fraction of 250 cc. contains only 3.5 grams of phenol. At this point, 47% of the phenate taken has been hydrolyzed.

The operation can be continued until the hydrolysis of the phenate is practically complete, but the percentage of phenol carried over becomes smaller and smaller as the amount of phenate remaining becomes smaller and smaller in proportion to the caustic soda formed by hydrolysis.

Example 2.—1 molecular proportion of sodium benzene-sulphonate and 1.5 molecular proportions of caustic soda are placed in the apparatus described in Example 1. A current of steam is passed through the mixture heated to 360° C. until the distillate contains 90% of the theoretical quantity of phenol.

Example 3.—A mixture formed of 1 gram molecular proportion of sodium benzene-sulphonate (crude or purified) and 1 or 1.2 gram molecular proportions of caustic soda is placed in the apparatus described in Example 1. The mass is heated to 280–370° C., and a current of steam passed through it (either superheated to 280–370° C., or not).

The phenol is promptly carried away by the steam.

When the reaction is finished, the current of steam is stopped, and the sodium sulphite, which is very pure, is emptied out of the apparatus.

It is possible to utilize half of this sulphite very advantageously by preparing from it sodium benzene-sulphonate by neutralizing it with benzene sulphonic acid separately prepared. In this way half a molecular proportion of sulphur dioxide is produced.

$$Na_2SO_3 + 2C_6H_5SO_3H \rightarrow 2C_6H_5SO_3Na + H_2O + SO_2$$

From the mixture of phenol and water in the condensate, there separates a layer of crude phenol; the water layer after separation can either be treated by the known processes for the recovery of the phenol (extraction or salting out), or it can be returned in the form of steam into the reaction vessel to react with the phenate and carry off fresh quantities of phenol.

The crude phenol is distilled to obtain pure phenol of melting point 41–42° C. The yield obtained exceeds 90% of the theoretical. The formation of diphenyl oxide is of the order of 0.5 to 4% of the phenol produced.

Example 4.—In the same apparatus as that used in Example 1 is placed a mixture of 1 gram molecular proportion of sodium benzene sulphonate with 2 gram molecular proportions (or 2.5 gram molecular proportions) of caustic soda. The mixture is heated to 280–370° C. as in an ordinary fusion. Steam is then passed through (either superheated to 280–370° C. or not) while at the same time a fresh molecular proportion of sodium benzene sulphonate is introduced through an appropriate arrangement. The latter reacts with the caustic soda which is liberated as the phenol is carried off with the steam. The reaction is brought to a finish as in Example 1.

Example 5.—Into an apparatus formed from a horizontally inclined cylinder movable around its axis, of which the axis (stirrer) is movable and which is heated to 300–370° C., a mixture of 1 gram molecule of sodium benzene sulphonate and 1 gram molecule of caustic soda is charged continuously while at the same time a current of steam (either superheated to 280–370° C. or not) is sent through the apparatus.

The phenol formed is carried away in a continuous manner by the steam while the sulphite of soda formed issues from the apparatus. Pure phenol is separated as in the other examples.

*Example 6.*—The quantity of phenol carried off by the steam can be increased by arranging in series several units of an apparatus such as that described in Example 1. Under these conditions the same current of steam circulates through the reaction vessels previously charged with a mixture of 1 molecular proportion of sodium benzene sulphonate and 1.2 molecular proportions of caustic soda which are heated to 350–370° C. If for example, 3 reaction vessels are grouped together, the steam at its exit from the last reaction vessel carries up to its own weight or even more of phenol.

*Example 7.*—Sodium phenate can be employed instead of caustic soda. For example, a mixture of 1 molecular proportion of sodium benzene sulphonate and 1.2 molecular proportions of sodium phenate is used. This mixture is placed in the apparatus described in Example 1, which is heated to 350–370° C. and stirred in a current of steam. The sodium phenate being hydrolyzed by the steam, the caustic soda formed reacts with the sodium benzene sulphonate and one finally obtains 2.2 molecular proportions of phenol.

*Example 8.*—In the same apparatus as that used in Example 1, 1 gram molecule of sodium naphthalene sulphonate is mixed with 2 gram molecules (or 2.4 gram molecules) of caustic soda. The mixture is heated to 270–325° C. as in an ordinary fusion. A current of steam (either superheated to 270–325° C. or not) is passed through the apparatus and at the same time a second molecular proportion of sodium naphthalene sulphonate is introduced through a suitable arrangement. This reacts with the caustic soda which is liberated at the same time as the naphthol which is carried away by the steam. The reaction is brought to an end as in Example 1. Part of the sodium naphthalene sulphonate is transformed into naphthalene.

*Example 9.*—In the same apparatus as that used in Example 1 is placed a mixture of 1 gram molecule of sodium p-toluene sulphonate with 1.2 gram molecules of caustic soda. The mixture is heated to 280–370° C. and a current of steam either superheated or not is passed through. The p-cresol liberated is promptly carried away by the current of steam.

What we claim and desire to secure by Letters Patent is:—

1. Process for the preparation of phenols, consisting in causing a current of steam to pass through phenates in the fused condition in a practically dry state, maintained throughout the mass and throughout the whole operation between 280 and 370° C. so that the steam hydrolyzes the phenate and carries off the phenol formed.

2. Process for the preparation of phenols, consisting in causing a current of steam to pass through a fused mixture of an alkali arylsulphonate and a caustic alkali in a practically dry state, maintained throughout the mass and throughout the whole operation between 280 and 370° C. so that the current of steam hydrolyzes the phenate first formed and carries off the phenol.

3. Process for the preparation of phenols, consisting in causing a current of steam to pass through a fused mixture of one molecular proportion of an alkali arylsulphonate and 1 to 1.3 molecular proportions of a caustic alkali in the fused condition in a practically dry state, maintained throughout the mass and throughout the whole operation between 280 and 370° C. so that the current of steam hydrolyzes the phenate formed in the first stage of the reaction from the arylsulphonate and caustic alkali, and carries off the phenol formed.

4. Process for the preparation of phenols, consisting in causing a current of steam to pass through a fused mixture of one molecular proportion of an alkali arylsulphonate and 2 molecular proportions of caustic alkali in the fused condition in a practically dry state, maintained throughout the mass and throughout the whole operation at a temperature between 280 and 370° C. and then adding a further portion of arylsulphonate to bring the molecular proportion of alkali to alkali arylsulphonate to 1 to 1.3 while the current of steam is passing through, the current of steam hydrolyzing the phenate formed in the first stage of the reaction from the arylsulphonate and caustic alkali and carrying off the phenol formed.

5. Process for the preparation of phenols, consisting in causing a current of steam to pass through a fused mixture of 1 molecular proportion of an alkali arylsulphonate and 1 to 1.3 molecular proportions of an alkali phenate in the fused condition in a practically dry state, maintained throughout the mass and throughout the whole operation between 280 and 370° C. so that the current of steam hydrolyzes the phenate with liberation of phenol and formation of caustic alkali which caustic alkali then reacts with the arylsulphonate to form a further portion of phenate which is in turn hydrolyzed by the steam with formation of phenol, the phenol being carried off by the steam as it is formed.

6. Process for the preparation of phenol consisting in causing a current of steam, which carries away the phenol formed, to pass through a stirred fused mixture of 1 molecular proportion of sodium benzene sulphonate and 1 to 1.3 molecular proportions of caustic soda maintained throughout the mass and throughout the operation between 280° and 370° C.

7. Process for the preparation of phenol in which one first effects a fusion of 1 molecular proportion of sodium benzene sulphonate and 2 molecular proportions of alkali, and causes the same to react with a current of steam passed through the stirred fused mass maintained throughout the mass and throughout the operation between 280° and 370° C. while gradually adding about 1 molecular proportion of sodium benzene sulphonate so that the current of steam carries away the phenol formed.

8. Process for the preparation of phenol consisting in causing a current of steam, which carries away the phenol formed, to pass through a stirred fused mixture of 1 molecular proportion of sodium benzene sulphonate and 1.3 molecular proportions of sodium phenate, maintained throughout the mass and throughout the operation between 280° and 370° C.

9. Process for the preparation of p-cresol consisting in causing a current of steam, which carries away the phenol formed, to pass through a stirred fused mixture of 1 molecular proportion of sodium p-tolyl-sulphonate and 1 to 1.3 molecular proportions of caustic soda maintained throughout the mass and throughout the operation between 280° and 370° C.

10. Process for the preparation of p-cresol in which one first effects a fusion of 1 molecular proportion of sodium p-tolyl sulphonate and 2 molecular proportions of alkali, and causes the same to react with a current of steam passed through the stirred fused mass maintained throughout the mass and throughout the operation between 280° and 370° C. while gradually adding about 1 molecular proportion of sodium p-tolyl sulphonate so that the current of steam carries away the p-cresol formed.

11. Process for the preparation of p-cresol consisting in causing a current of steam, which carries away the phenol formed, to pass through a stirred fused mixture of 1 molecular proportion of sodium p-tolyl sulphonate and 1.3 molecular proportions of sodium p-cresolate, maintained throughout the mass and throughout the operation between 280° and 370° C.

12. Process for the preparation of naphthol consisting in causing a current of steam, which carries away the phenol formed, to pass through a stirred fused mixture of 1 molecular proportion of sodium naphthalene-sulphonate and 1 to 1.3 molecular proportions of caustic soda, maintained throughout the mass and throughout the operation between 280° and 370° C.

13. Process for the preparation of naphthol in which one first effects a fusion of 1 molecular proportion of sodium naphthalene sulphonate and 2 molecular proportions of alkali, and causes the same to react with a current of steam passed through the stirred fused mass maintained throughout the mass and throughout the operation between 280° and 370° C. while gradually adding about 1 molecular proportion of sodium naphthalene sulphonate so that the current of steam carries away the naphthol formed.

14. Process for the preparation of naphthol consisting in causing a current of steam, which carries away the phenol formed, to pass through a stirred fused mixture of 1 molecular proportion of sodium naphthalene sulphonate and 1.3 molecular proportions of sodium naphthalate, maintained throughout the mass and throughout the operation between 280° and 370° C.

MAURICE ERNEST BOUVIER.
LOUIS DOMINIQUE BARDIN.